UNITED STATES PATENT OFFICE.

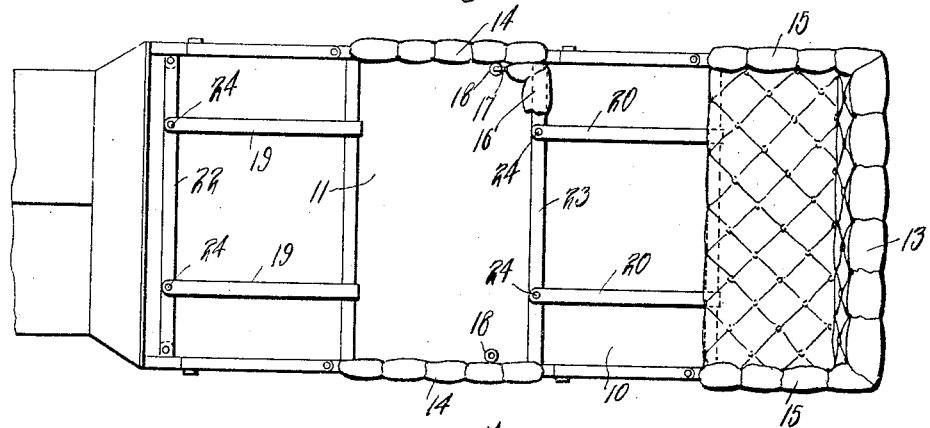

ERNEST WYNN, OF LAONA, WISCONSIN.

AUTOMOBILE-BODY.

1,273,977.　　　　　Specification of Letters Patent.　　Patented July 30, 1918.

Application filed December 7, 1916. Serial No. 135,660.

*To all whom it may concern:*

Be it known that I, ERNEST WYNN, a citizen of the United States, residing at Laona, in the county of Forest and State of Wisconsin, have invented certain new and useful Improvements in Automobile-Bodies, of which the following is a specification.

This invention relates to an improved automobile body with special reference to the seat structure thereof and the principal object of the invention is to provide an automobile in which the back of the forward seat may be let down into the space between the forward and rear seats, and together with the forward and rear seats and a cushion supported in front of the forward seat, provide a couch.

Another object of the invention is to provide an improved means for supporting the back of the forward seat when let down and for supporting the auxiliary cushion when placed in front of the forward seat.

Another object of the invention is to so construct this auxiliary supporting means that when not in use, the supporting bars may be turned out of the way.

Another object of the invention is to so construct this device that when the back of the forward seat is turned up to its normal position, the automobile will not lose its conventional structure but will have the appearance of an ordinary body.

This invention is illustrated in the accompanying drawings, wherein:—

Figure 1 is a view showing the improved body in top plan with the supporting bars in position and the back of the forward seat broken away.

Fig. 2 is a view showing the improved automobile body principally in longitudinal section and partly in elevation, and, Fig. 3 is an enlarged fragmentary sectional view through the forward seat of the automobile body with the back in the raised position.

The automobile body indicated in general by the numeral 10 is provided with a forward seat 11 and a rear seat 12, the rear seat being provided with a stationary cushioned back 13 and each seat being provided with cushioned side walls indicated by the numerals 14 and 15. The cushioned back 16 of the forward seat is positioned between the side walls of the forward seat and when in the upright position, will be held in place by the hooks 17 which hooks engage the eyes 18 as shown in Figs. 1 and 3.

The supporting bars 19 and 20 which are to support the cushion 21 and the back 16 when in the position shown in Fig. 2 are carried by the cross bar 22 and the strip 23, respectively, the supporting bars 19 and 20 being provided with pins 24 fitting into corresponding openings in the cross bars 22 and 23 and thus releasably connecting the supporting bars with the cross bars. The rear end portions of these supporting bars 19 and 20 will rest upon the forward seat 11 and rear seat as shown in Fig. 2 and if desired, these bars may be formed of angle iron thus adding strength and providing depending flanges which would prevent pivotal movement of the supporting bars thus preventing danger of the bars slipping out of place.

When in use, the cushions 25 and 26 will rest upon the seats 11 and 12 and the back of the forward seat will be held in the raised position. The supporting bars 19 and 20 will of course be removed and placed beneath one of the seats or in any other convenient place. The cross bar or carrying bar 22 can then be used as a coat holder. When traveling by road, a person is often unable to reach a hotel or other place where accommodations for the night can be obtained and when this occurs the supporting bars 19 and 20 will be put in place with the free ends extending beneath the seat cushions as shown in Fig. 2. The back of the forward seat will then be released from the hooks and it will be put in place between the forward and rear seats and the cushion 21 which when not in use as shown in Fig. 2, may rest upon the floor of the car, will be placed upon the supporting bars 19 thus completing the structure. Suitable coverings could then be put in place and a bed would be provided. This structure would also be very convenient for use in case a party were traveling by road and one of the party should be taken sick. When ready to again proceed, the cushion 21 will be removed from the supporting bars 19, the supporting bars 19 taken off and after the back 16 has been raised and secured, the supporting bars 20 will be taken off and these bars together with the bars 19 put away.

There has thus been provided an automobile body having a construction which will permit of its being converted into a bed.

What is claimed is:—

A vehicle body provided with a forward and a rearward seat, a supporting bar extending transversely across said body in spaced relation to the forward end thereof and in spaced relation to said forward seat, said bar being provided with openings formed therein, a pair of removable bars extending longitudinally of said body and provided at their forward ends with pins adapted to be removably disposed in said openings and having their opposite ends resting upon one edge of said forward seat, a second supporting bar provided with openings and extending across the opposite edge of said forward seat, and a plurality of longitudinally extending bars equipped at their forward ends with pins adapted to be disposed in the apertures of said last mentioned supporting bar and having their opposite ends resting upon the forward edge of the rear seat.

In testimony whereof I affix my signature in presence of two witnesses.

ERNEST WYNN.

Witnesses:
SOUN S. RUNGBORG,
ELMER HOLM.